UNITED STATES PATENT OFFICE 2,610,945

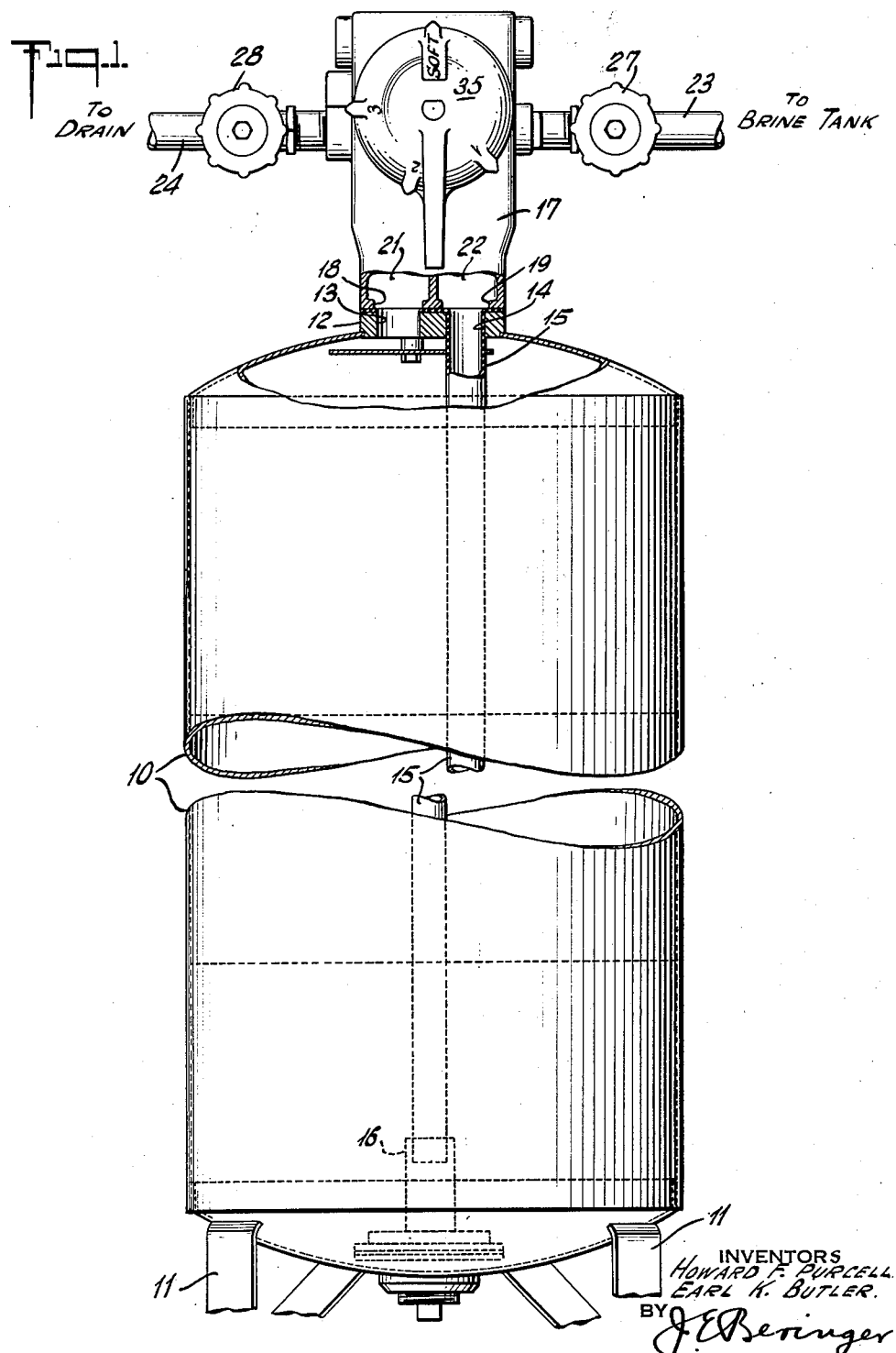

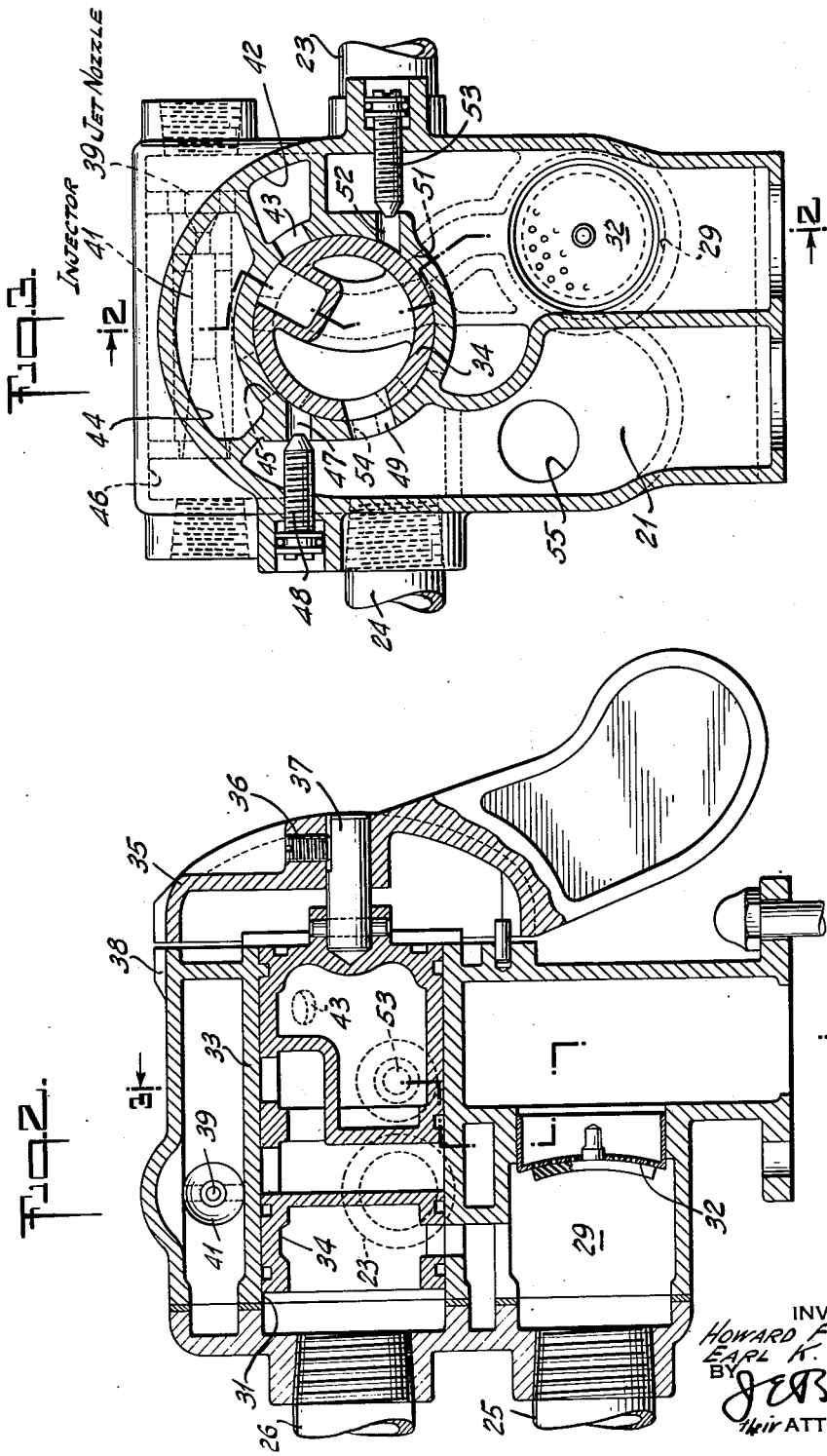

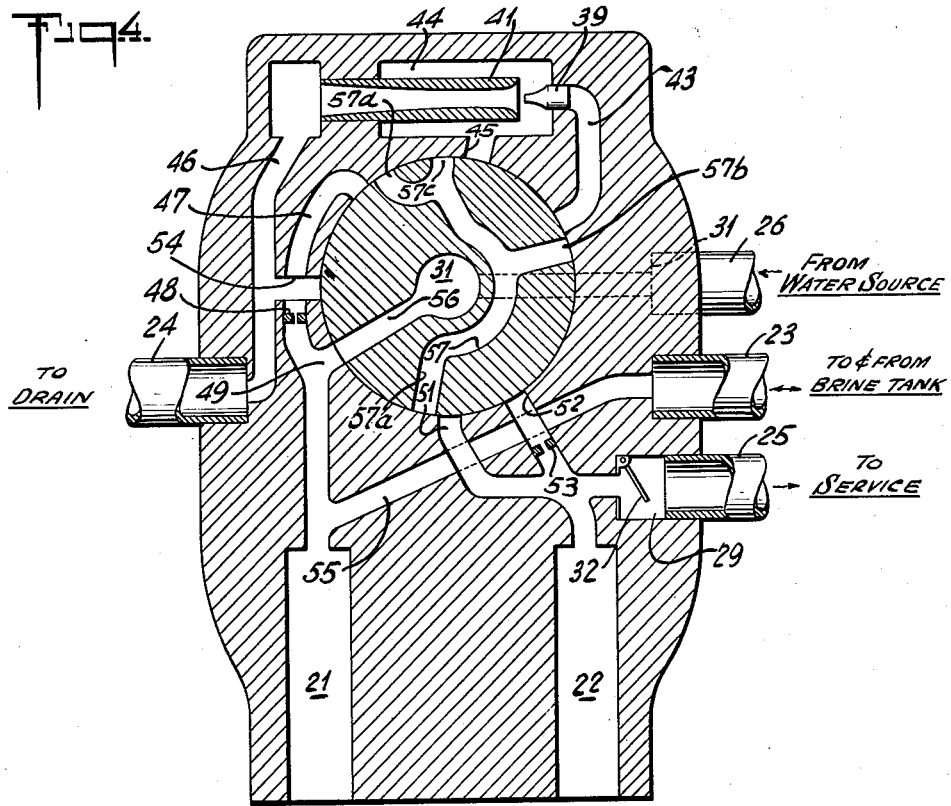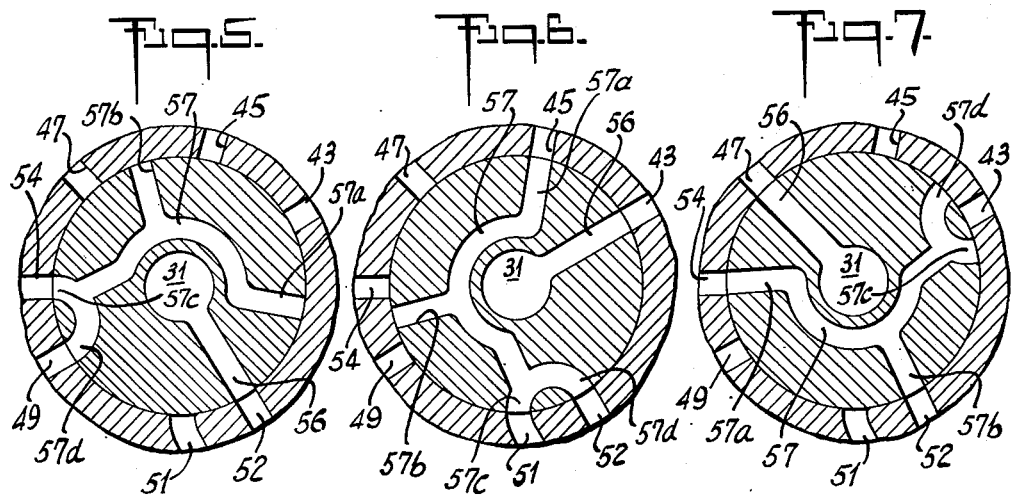

WATER SOFTENING APPARATUS

Howard Fredrick Purcell, Dayton, and Earl K. Butler, Xenia, Ohio, assignors to The Dayton Pump & Manufacturing Company, Dayton, Ohio, a corporation of Ohio Application May 15, 1950, Serial No. 161,938

5 Claims. (Cl. 210—24)

This invention relates to water softening apparatus, particularly of the kind presenting a mineral tank and a brine tank with means for drawing brine from the brine tank and passing it over the minerals in the mineral tank as a part of the reactivating or regenerating operation.

It is an especial object of the invention to reduce time and wastage in the regeneration operation by utilizing undiluted, saturated brine for reactivation of the minerals. Heretofore, the solution supplied for this purpose has been a mixture of saturated brine and raw water.

Another object of the invention is to provide for simplified control of a regenerating operation through a unitary valve body and a valve rotor adjustable therein through a series of indexing positions to initiate the successive steps of backwashing, brining, rinsing and refilling of the brine tank.

A further object of the invention is to effect a general reorganization of the valve controls with the view of decreasing the cost of manufacture thereof, of providing for quick full flow and of precluding leakage.

Other objects and structural details of the invention will appear from the following description when read in connection with the accompanying drawings, wherein:

Fig. 1 is a view in front elevation of water softener apparatus in accordance with the instant invention, the brine tank being omitted;

Fig. 2 is a view in longitudinal section of the unitary valve body mounted on the mineral tank, the view being taken substantially along the line 2—2 of Fig. 3;

Fig. 3 is a view in cross section taken substantially along the line 3—3 of Fig. 2;

Fig. 4 is a diagrammatic view of the valve body, showing the rotor in its normal or softening position; and Figs. 5, 6 and 7 are fragmentary diagrams similar to Fig. 4, showing the rotor in the positions it occupies respectively in the backwashing, brining and rinsing positions.

The invention is disclosed in connection with a water softening system of the two tank type. In such a system a mineral tank and a brine tank are arranged alongside one another, with the former containing minerals for removal of chemical and physical properties which contribute to hardness in water, and with the latter containing brine to be passed through the mineral bed at time intervals for regeneration thereof.

The brine tank may be of any conventional kind and is not shown herein. The mineral tank, as shown in Fig. 1, is a closed cylindrical body 10 which stands on end, resting on feet 11 or the like. The upper end of the tank 11 has a relatively small diameter opening closed by a flange 12. Arranged alongside one another in the flange 12 are two through openings 13 and 14, the former communicating directly with the top of tank 10 and the latter communicating with the bottom of the tank through a tube 15. The upper end of tube 15 is received in opening 14. The lower end thereof is received in a hollow standard 16 providing for free flow between tube 15 and the bottom of the tank.

Mounted on the flange 12 is a valve body 17 having openings 18 and 19 overlying and registering with the openings 13 and 14. Respective passages 21 and 22 in the valve body communicate with the openings 18 and 19. The valve body 17 is also connected by a pipe 23 to the brine tank, by a pipe 24 to a place of drain, by a pipe 25 (Fig. 2) to the house service line or other place of utilization of the softened water, and by a pipe 26 to a hard water source as the city supply line. Flow through the brine pipe 23 and through the drain pipe 24 is controlled by respective shut off valves 27 and 28 which are normally closed. The pipes 25 and 26 are in open communication with respective chambers 29 and 31 in the body 17. The chamber 29 is connected by way of an inwardly closing outwardly opening check valve 32 with the aforementioned passage 22. The chamber 31 is formed in a cylindrical wall 33 in the body 17 and mounts a valve rotor 34. As will hereinafter more clearly appear, the rotor 34 is operative, in conjunction with radial ports in the wall 33 and associated passages and chambers in the body 17, to direct incoming water from the pipe 26 selectively in the system and to control resulting flow through the mineral tank and to and from the brine tank. The rotor 34 is turned by an indicator lever 35 fixed to one end thereof and positioned at the front of the valve body for hand manipulation. As shown in Figs. 1 and 2, the lever 35 is detachably connected by a set screw 36 to one end of a stub shaft 37 the other end of which is pinned to the rotor 34. Marked on the front face of the lever 35 are position indications "Soft," "1," "2" and "3," which in a regenerating operation are brought successively to registry with a lug 38 formed on the body 17.

Also contained in the body 17 is a jet pump comprising a nozzle 39 and an injector 41, the pump being in transverse overlying relation to the rotor chamber 31. The nozzle 39 communicates with a chamber 42 connected to rotor chamber 31 by a port 43 in the wall 33. The space between the nozzle and injector communicates with a chamber 44 connected by a port 45 with the rotor chamber 31. The discharge end of the injector 41 opens into a chamber 46 communicating with drain pipe 24.

Other ports in the wall 33 comprise a port 47 opening into the passage 21 and controlled by a metering screw 48, another port 49 opening into the passage 21, two ports 51 and 52 opening into the passage 22, the port 52 being controlled by a metering screw 53, and a port 54 (in a plane with port 49) opening into chamber 46 which communicates with the drain pipe 24.

A passage 55 in the body 17 connects the passage 21 to the pipe 23 communicating with the brine tank. This passage, as well as the ports and chambers above described, is illustrated in diagram in Fig. 4 wherein the compartments and passages of the rotor 34 are also shown in diagrammatic form. As there indicated, water supplied from pipe 26 is continuously admitted to the interior of the rotor through one end thereof and is conducted to the periphery of the rotor through a passage 56. Other paths through the rotor are represented by a transverse passage or chamber 57 having outlets $57^a$, $57^b$, $57^c$ and $57^d$ to the periphery of the rotor.

In the operation of the system, the brine and drain valves 27 and 28 (Fig. 1) are normally closed, and the indicator lever 35 is set to the "Soft" position. As so adjusted the rotor 34 occupies the position shown in Fig. 4 with water supply passage 56 thereof registering with port 49. The flow of water, therefore, is from pipe 26 through the rotor to passage 21 and downward through the opening 21 in flange 12 to the top of the mineral tank 10. At the bottom of the tank 10, the water enters tube 15 and flows reversely upward in the tube and into passage 22 of the valve body. From passage 22 the water flows past the check valve 32 into chamber 29 and out to service by way of pipe 25.

In a regenerating operation, the first step thereof is a backwash of the mineral bed to flush out impurities and foreign particles that may have collected therein. In setting the indicator lever 35 to position "1," therefore, the rotor 34 assumes the position shown in Fig. 5 with the supply passage 56 registering with port 52. At the same time, as shown, the outlets $57^d$ and $57^c$ of chamber 57 are brought respectively to registry with the ports 49 and 54. In accompaniment with, or immediately before or after, the described adjustment of lever 35, the drain valve 28 is opened. As a result the flow of water is, in this position of the ports, from the source through rotor 34 to port 52 and past metering screw 53 to passage 22 and thence by way of tube 15 to the bottom of the mineral tank 10. Flowing upward in the tank 10, the water reenters body 17 by way of registering openings 13 and 18 and is conducted by passage 21 to port 49 where it is directed through interconnected outlets $57^d$ and $57^c$ of rotor 34 to port 54. Discharging from port 54 into chamber 46, the water passes to drain by way of pipe 24.

In the second step of the regenerating operation, brine is drawn from the brine tank and passed through the mineral tank to reactivate the minerals therein. Opening the brine valve 27 and setting the indicator lever 35 to position "2," therefore, the rotor 34 assumes the position shown in Fig. 6 wherein water supply passage 56 registers with port 43, outlet $57^a$ of chamber 57 registers with port 45 and outlets $57^c$ and $57^d$ register respectively with ports 51 and 52. Since port 43 communicates with the jet nozzle 39, in this position of the rotor 34 the jet pump is energized with water flowing from the source through the rotor to nozzle 39 and discharged thereby into the injector or Venturi tube 41 from whence it passes to chamber 46 and drain. In accordance with understood principles of jet pump operation, the action of the nozzle 39 in conjunction with injector 41 is such as to create a pressure drop at the inlet end of the injector, which end communicates with chamber 44 and the port 45. Accordingly, since the port 45 is now connected through the rotor chamber 57 with ports 51 and 52 and passage 22 the suction force created by the jet pump is such as to induce flow from the bottom of the mineral tank upward through tube 15 and through passage 22 and then through rotor 34 to chamber 44 and out to drain by way of injector 41. The exhausting of fluid from the tank 10 in this manner in turn creates a suction force at the top of the mineral tank which is effective through passage 21, passage 55 and pipe 23 to draw brine from the brine tank. Flowing through the described connection, undiluted brine accordingly descends in the mineral bed, performing its reactivating function.

In the final operational stage of regeneration, the mineral bed is rinsed of brine. Closing the brine valve 27 and setting the indicator lever 35 to position "3," the rotor 34 assumes the position shown in Fig. 7 wherein the water supply passage 56 is connected to port 47 and outlets $57^a$ and $57^b$ of chamber 57 establish a connection between ports 54 and 52. The flow of water is at this time through port 47 and past metering screw 48 to passage 21 and the top of the mineral tank. Descending through and washing the mineral bed, the water is returned upward by tube 15 and follows a path through passage 22, port 52, rotor 34, port 54 and chamber 46 to drain.

At the conclusion of the rinsing operation, the drain valve 28 may be closed and lever 35 is moved its final step back to "Soft" position. The rotor 34 thereby is restored to its normal position of Fig. 4 with the hard water being directed to the top of the mineral tank 10 for softening and then up the tube 15 to passage 22 and out to service past check valve 32. After such restoration to normal, the brine valve 27 may be opened briefly to refill the brine tank by way of passage 55.

With regard to the metering screws 48 and 53, it will be understood that these represent simply a means for varying the rate of flow in the backwash and rinsing cycles so that this flow may be correct with respect to the locally prevailing average water pressure.

What is claimed is:

1. In a water softening apparatus; a mineral tank having first and second openings in the top communicating with the top and bottom of the tank, respectively, a valve body mounted on top of the tank having first and second chambers communicating with said first and second openings, respectively, a jet pump in said body, said body having a valve bore, passages in said valve body providing restricted and unrestricted communication of said bore with said first and second chambers, respectively, other passages in said valve body communicating said bore with the inlet of said jet pump, with the suction zone of said jet pump, and with exhaust, a valve member in said bore having a raw water supply port on its periphery and also having a channel extending therethrough, said valve member having a normal position where said supply port communicates with said first chamber through the unrestricted passage leading thereto and said channel is closed, a second position where the supply port communicates with the second chamber through the restricted passage leading thereto and said channel connects said first chamber with exhaust, a third position where said supply port communicates with the passage leading to the inlet of the jet pump and said channel interconnects the passages leading to said second chamber and to the suction zone of said jet pump, and another position where said supply port communicates with said first chamber through the restricted passage and said channel connects the passages leading to said second chamber and exhaust, said valve member being movable into its several adjusted positions and back to its normal position by indexing movements in one and the same direction, a service conduit connected with said second chamber, and a brine supply conduit connected to said first chamber.

2. In a water softening apparatus; a mineral tank having first and second openings in the top communicating with the top and bottom of the tank, respectively, a valve body mounted on top of the tank having first and second chambers communicating with said first and second openings, respectively, a jet pump in said body, said body having a valve bore, passages in said valve body providing restricted and unrestricted communication of said bore with said first and second chambers, respectively, other passages in said valve body communicating said bore with the inlet of said jet pump, with the suction zone of said jet pump, and with exhaust, a valve member in said bore having a raw water supply port on its periphery and also having a channel extending therethrough, said valve member having a normal position where said supply port communicates with said first chamber through the unrestricted passage leading thereto and said channel is closed, a second position where the supply port communicates with the second chamber through the restricted passage leading thereto and said channel connects said first chamber with exhaust, a third position where the said supply port communicates with the passage leading to the inlet of the jet pump and said channel interconnects the passages leading to said second chamber and to the suction zone of said jet pump, and another position where said supply port communicates with said first chamber through the restricted passage and said channel connects the passages leading to said second chamber and exhaust, said valve member being movable into its several adjusted positions and back to its normal position by indexing movements in one and the same direction, a service conduit connected with said second chamber, and a brine supply conduit connected said first chamber, said restricted passages including needle valves adjustable from externally of the valve body.

3. In a water softening apparatus; a mineral tank having first and second openings in the top communicating with the top and bottom of the tank, a valve body on top of the tank having first and second chambers communicating with said first and second openings, respectively, a jet pump in said body, drain, service, brine supply, and raw water supply conduits connected with said valve body, said valve body having a valve bore therein, ports in the periphery of said valve bore leading to said first and second chambers, to the inlet of said jet pump, to the suction zone of said jet pump, and to said drain conduit, a valve member in said bore having a raw water supply port in its periphery connected with said raw water supply conduit and also having a channel extending therethrough, said service conduit being connected with said second chamber and said brine supply conduit being connected with said first chamber, and said valve member being movable in one and the same direction into a plurality of indexed positions wherein the supply port is successively connected with said first chamber, then with said second chamber, then with the inlet of said jet pump, and then again with said second chamber, while in the same position of said valve member said channel successively interconnects, first, none of said ports, then the first chamber with the drain conduit, then the second chamber with the suction zone of said jet pump, and then the second chamber with the drain conduit.

4. In a water softening apparatus; a mineral tank having first and second openings in the top communicating with the top and bottom of the tank, a valve body on top of the tank having first and second chambers communicating with said first and second openings, respectively, a jet pump in said body, drain, service, brine supply, and raw water supply conduits connected with said valve body, said valve body having a valve bore therein, ports in the periphery of said valve bore leading to said first and second chambers, to the inlet of said jet pump, to the suction zone of said jet pump, and to said drain conduit, a valve member in said bore having a raw water supply port in its periphery connected with said raw water supply conduit and also having a channel extending therethrough, said service conduit being connected with said second chamber and said brine supply conduit being connected with said first chamber, and said valve member being movable in one and the same direction into a plurality of indexed positions wherein the supply port is successively connected with said first chamber, then with said second chamber, then with the inlet of said jet pump, and then again with said second chamber, while in the same position of said valve member said channel successively interconnects, first, none of said ports, then the first chamber with the drain conduit, then the second chamber with the suction zone of said jet pump, and then the second chamber with the drain conduit, said brine supply conduit including a manually operable valve.

5. In a water softening apparatus; a mineral tank having first and second openings in the top communicating with the top and bottom, respectively, of the tank, a valve body mounted on top of the tank having first and second chambers communicating with said first and second openings, respectively, drain, service, brine supply, and raw water supply conduits connected with said valve body, a jet pump in said body having a discharge side connected with said drain conduit, said valve body having a valve bore therein, ports distributed about the periphery of said bore communicating with passages providing free and restricted communication with said first and second chambers, respectively, and free communication with the inlet of said jet pump, with the suction zone of said jet pump, and with said drain conduit, a valve member in said bore having a raw water supply port in its periphery connected with said raw water supply conduit and also having a channel extending therethrough, said service conduit being connected with said second chamber and said brine supply conduit being connected with said first chamber, and said valve member being movable in one and the same direction into a plurality of indexed positions wherein the supply port is successively connected with the unrestricted passage leading to said first chamber, then with the restricted passage leading to said second chamber, then with the passage leading to the inlet of said jet pump, and then with the restricted passage leading to said second chamber, while in the same positions of said valve member said channel successively interconnects, first, none of said passages, then the passages leading to said first chamber and the drain conduit, then the passages leading to the second chamber and the suction zone of said jet pump, and then the passages leading to said second chamber and to the drain conduit.

HOWARD FREDRICK PURCELL.
EARL K. BUTLER.

REFERENCES CITED

The following references are of record in the file of this patent:

UNITED STATES PATENTS

| Number | Name | Date |
|---|---|---|
| 1,775,412 | Tannehill | Sept. 9, 1930 |
| 1,784,892 | Duden | Dec. 16, 1930 |
| 2,036,634 | Inch | Apr. 7, 1936 |
| 2,153,559 | Hendricks | Apr. 11, 1939 |
| 2,254,421 | Eukmeyer et al. | Sept. 2, 1941 |
| 2,506,711 | Evans | May 9, 1950 |

FOREIGN PATENTS

| Number | Country | Date |
|---|---|---|
| 506,820 | Great Britain | Aug. 30, 1937 |